(12) United States Patent
Bodén et al.

(10) Patent No.: US 11,649,748 B2
(45) Date of Patent: May 16, 2023

(54) FLUID DRAIN PLUG FOR A FLUID RESERVOIR

(71) Applicant: VOLVO TRUCK CORPORATION, Gothenburg (SE)

(72) Inventors: Roger Bodén, Kungsbacka (SE); Lars Kastensson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 208 days.

(21) Appl. No.: 17/287,853

(22) PCT Filed: Oct. 24, 2018

(86) PCT No.: PCT/EP2018/079200
§ 371 (c)(1),
(2) Date: Apr. 22, 2021

(87) PCT Pub. No.: WO2020/083485
PCT Pub. Date: Apr. 30, 2020

(65) Prior Publication Data
US 2021/0381407 A1    Dec. 9, 2021

(51) Int. Cl.
*F01M 11/04* (2006.01)
*F01M 11/00* (2006.01)
(Continued)

(52) U.S. Cl.
CPC ..... *F01M 11/0408* (2013.01); *F01M 11/0004* (2013.01); *F01P 11/0276* (2013.01); *F16L 37/248* (2013.01); *F01M 2011/0416* (2013.01)

(58) Field of Classification Search
CPC ........... F01M 11/0408; F01M 11/0004; F01M 2011/0416; F01P 11/0276; F16L 37/248; F16L 55/07
See application file for complete search history.

(56) References Cited

U.S. PATENT DOCUMENTS

| 3,879,013 A | 4/1975 | Hajek |
| 2008/0000724 A1 | 1/2008 | Stlaske et al. |

(Continued)

FOREIGN PATENT DOCUMENTS

| DE | 202017103222 U1 | 8/2018 |
| EP | 0715113 A1 | 6/1996 |

(Continued)

OTHER PUBLICATIONS

Chinese Office Action dated Apr. 21, 2022 in corresponding Chinese Patent Application No. 201880098923.1, 6 pages.

(Continued)

*Primary Examiner* — Jacob M Amick
*Assistant Examiner* — Charles J Brauch
(74) *Attorney, Agent, or Firm* — Venable LLP; Jeffri A. Kaminski (57) ABSTRACT

The invention relates to a fluid drain plug (10) for a fluid reservoir (50) with a drain hole (51), the plug having an extension in an axial direction (A) and comprising a body part (16) rotationally insertable into the drain hole (51), the body part having a proximal axial end (15), a distal axial end (17) and a substantially circular cross section with an outer surface (18), wherein the body part comprises a drain channel (92) having an inlet (91) located at the distal axial end and an outlet opening (94) disposed on the outer surface (18), the body part further comprising a bayonet-type connection slot (40) for accommodating a part of a radial projection (52) of a circumferential surface surrounding the drain hole (51), the bayonet-type connection slot being disposed on the outer surface and comprising an entrance (40*a*) at the distal axial end, a first path (41) and a second path (42), the first path (41) extending from the entrance, in the axial direction (A) and in one circumferential direction (C), to a first path terminal portion (70), wherein the first (Continued)

path terminal portion (70) is adapted to accommodate the radial projection (52), and the second path (42) extending from the first path terminal portion, in the axial direction (A) and in an opposite direction to the one circumferential direction (C), to a second path terminal portion (72), wherein the second path terminal portion (72) is adapted to accommodate the radial projection.

21 Claims, 8 Drawing Sheets

(51) Int. Cl.
    *F01P 11/02*      (2006.01)
    *F16L 37/248*      (2006.01)

(56) References Cited

U.S. PATENT DOCUMENTS

| | | |
|---|---|---|
| 2008/0135340 A1 | 6/2008 | Schlicker et al. |
| 2010/0006376 A1 | 1/2010 | Jessberger et al. |
| 2011/0011865 A1 | 1/2011 | Cook et al. |

FOREIGN PATENT DOCUMENTS

| | | | |
|---|---|---|---|
| EP | 2463487 A1 | 6/2012 | |
| JP | S4977230 A | 7/1974 | |
| WO | 2010017867 A1 | 2/2010 | |
| WO | WO-2011008261 A1 * | 1/2011 | ......... F01M 11/0004 |

OTHER PUBLICATIONS

International Search Report and Written Opinion dated Jul. 10, 2019 in corresponding International PCT Application No. PCT/EP2018/079200, 10 pages.

* cited by examiner

FLUID DRAIN PLUG FOR A FLUID RESERVOIR

CROSS-REFERENCE TO RELATED APPLICATIONS

This application is a U.S. National Stage application of PCT/EP2018/079200, filed Oct. 24, 2018, and published on Apr. 30, 2020, as WO 2020/083485 A1, all of which is hereby incorporated by reference in its entirety.

TECHNICAL FIELD

The invention relates to a fluid drain plug for a fluid reservoir. In particular, the invention relates to an oil drain plug for an oil pan reservoir of a vehicle. The invention also relates to a fluid reservoir assembly for a vehicle comprising a fluid reservoir and a fluid drain plug, in particular an oil pan reservoir assembly comprising an oil pan reservoir and an oil drain plug. Moreover, the invention relates to a vehicle comprising such a fluid reservoir assembly or fluid drain plug. Further, the invention relates to a method for controlling drainage of fluid from a fluid reservoir assembly. The invention is applicable on vehicles, in particular heavy-duty vehicles, such as trucks, buses and construction equipment. Although the invention will be described in relation to a truck, the invention is not restricted to this particular vehicle, but may also be used in other types of vehicles such as cars, working machines within the fields of industrial construction machines or construction equipment, such as articulated haulers, dump trucks, wheel loaders and the like. The invention may also be used in other types of industrial machines, engines and applications.

BACKGROUND

In fluid systems for vehicles, such as oil systems for engines and gear boxes, there is a need for performing service maintenance on a regularly basis in order to ensure reliable and long-lasting operations. This is at least partly due to that the engine oil is subject to thermal and mechanical degradation, which typically reduces e.g. the viscosity. At reduced viscosity, the oil is not as capable of lubricating the engine, thus increasing wear as well as the risk of overheating. One type of service maintenances thus relates to oil change, which is usually scheduled based on the time in service or the distance that the vehicle has traveled.

The engine oil is typically contained in the oil pan reservoir, arranged underneath the internal combustion engine or in close proximity to the components of the engine requiring oil during operation of the vehicle. While there are a number of different types of oil pan systems, a conventional oil pan system generally consists of an oil reservoir containing the oil and a drain plug located at the bottom of the oil reservoir. When there is a need for an oil change, service personnel can change oil by moving the drain plug from a closed position to an open position, whereby the oil can drain from the oil reservoir.

In order to permit easy drainage of oil from the oil pan, some types of oil drain plugs may be provided with threads to cooperate with corresponding threads arranged about a drain hole of the oil reservoir. In addition, some types of oil drain plugs may use a bayonet-type connection to set the oil drain plug in an engaged state relative the oil pan. In US 2008/000724 A1, there is disclosed a drain plug adapted to be rotatable relative to an aperture of an oil pan between closed and opened positions with less than a full rotation of the plug. Further, the drain plug is configured to be held within the aperture even when loosened. In one example, the drain plug includes a retention tab near an inner end thereof engaging the aperture with the drain plug in the opened position. Hereby, axial movement of the drain plug relative to the aperture is limited, thus the drain plug remains secured to the aperture even in the opened position.

Although this type of drain plug is generally useable for various types of vehicles such as heavy-duty vehicles, there is still a need for an improved fluid drain plug and a fluid reservoir allowing fluid to be easily drained from the fluid reservoir. Further, there remains a need in the field of oil pan systems for improving the control of draining of oil from the oil pan.

SUMMARY

It is an object of the present invention to improve fluid drainage from a fluid reservoir assembly of a vehicle, while enabling easy removal and installation of the fluid plug. The object is at least partly achieved by a fluid drain plug according to claim 1.

According to a first aspect of the present invention, there is provided a fluid drain plug for a fluid reservoir with a drain hole. The fluid drain plug has an extension in an axial direction and comprises a body part rotationally insertable into the drain hole. The body part has a proximal axial end, a distal axial end and a substantially circular cross section with an outer surface. The body part comprises a drain channel having an inlet located at the distal axial end and an outlet opening disposed on the outer surface. Further, the body part comprises a bayonet-type connection slot for accommodating a part of a radial projection of a circumferential surface surrounding the drain hole. The bayonet-type connection slot is disposed on the outer surface and comprises an entrance at the distal axial end, a first path and a second path.

The first path extends from the entrance, in the axial direction and in one circumferential direction, to a first path terminal portion. The first path terminal portion is adapted to accommodate the radial projection. The second path extends from the first path terminal portion, in the axial direction and in an opposite direction to the one circumferential direction, to a second path terminal portion. The second path terminal portion is adapted to accommodate the radial projection.

In this manner, the example embodiments of the invention contribute to an improved functional interface between the fluid drain plug and the fluid reservoir. In particular, by the configuration of the bayonet-type connection slot with an entrance, a first path and a second path according to the above, the fluid drain plug provides for a practical and intuitive twist-and-lock function relative the fluid reservoir, while enabling fluid to be drained via the drain channel in an efficient manner.

Moreover, by having a bayonet-type connection slot extending in opposite circumferential directions by means of the first path and the second path, and by having the first path terminal portion and the second path terminal portion for accommodating the projection, the fluid drain plug can be set in two different engaged states relative the fluid reservoir by rotational movements of the fluid drain plug. As will be further described herein, the engaged states generally refers to a drainage position (the first path terminal portion), in which the fluid drain plug is arranged relative the drain hole to permit fluid drainage via the drain channel, and a fluid drain plug closed position (the second path terminal portion), in which the fluid drain plug forms a liquid-tight connection relative the drain hole.

Also, by having a bayonet-type connection slot with an entrance, the fluid drain plug is permitted to be completely removed from the fluid reservoir when further rotated in the circumferential direction, and relative the drain hole of the fluid reservoir. Accordingly, the fluid drain plug is not only adapted to provide a closed position and a drainage position relative the fluid reservoir, but also adapted to be removed from the fluid reservoir in an easy and intuitive manner.

In this manner, the example embodiments of the invention also contribute to a user-friendly and efficient interface between the fluid drain plug and the fluid reservoir. In addition, it is also believed that the fluid drain plug can be connected to the fluid reservoir in a relatively fool proof manner as soon as the fluid drain plug is positioned to cooperate with the fluid reservoir via the bayonet-type connection slot. The example embodiments of the invention may also contribute to improved ergonomics for the service personnel and a quicker change of fluid in the fluid reservoir, partly as the fluid drain plug can be easily removed by hand. The configuration of the example embodiments of the invention may typically have a positive impact on the work environment for the service personnel, partly as the fluid drain plug typically reduces the risk of fluid smudge as fluid drainage can occur with the fluid drain plug in a non-removal position, i.e. the drainage position of the fluid drain plug, which is provided at least partly by the first path terminal portion of the bayonet-type connection slot. The risk of having fluid smudge is also at least partly reduced by the provision of having a body part with a drain channel, enabling to control the flow of fluid in a more accurate manner compared to completely solid fluid drain plugs without drain channels.

It should be noted that the fluid may be a liquid such as oil for the engine, e.g. lubrication oil. However, the liquid may also be transmission oil, oil for lubricating a shaft, or a cooling fluid in a cooling system etc.

According to one example embodiment, the fluid drain plug comprises a head part extending from the proximal axial end of the body part. The head part is typically adapted to be reachable by a user, thus permitting easy adjustability of the fluid drain plug from an outside of the fluid reservoir. In addition, the head part may comprise a tab portion. In addition, or alternatively, the head part may comprise a slot adapted for cooperating with a tool such as a screw driver or the like. It is also conceivable that the fluid drain plug is provided without a head part. In this type of fluid drain plugs, the adjustability of the fluid drain plug may be effected by having a slot in the proximal axial end of the body part, wherein the slot is adapted to cooperate with a tool such as a screw driver or the like.

While the fluid drain plug can be used in a fluid reservoir assembly for various types of fluids, the example embodiments of the invention are particularly useful for a fluid such as oil. Hence, according to one example embodiment, the fluid drain plug is an oil drain plug for an oil reservoir, such as a conventional oil pan of an engine, e.g. an internal combustion engine of a vehicle.

The bayonet-type connection slot typically refers to a groove or channel suitable for cooperating with a mating component to form a bayonet-type connection when set in a fully engaged state relative each other. When the fluid drain plug is insertable into the drain hole of the fluid reservoir, and the projection of the fluid reservoir is located in the entrance of the bayonet-type connection slot, the fluid drain plug is rotated about its centre axis (relative the hole of the fluid reservoir) until the first path terminal portion, in which the fluid drain plug is set in the drainage position, allowing fluid to drain from the fluid reservoir via the drain channel of the fluid drain plug. The fluid drain plug is maintained in the engaged state in the drainage position by having the projection of the fluid reservoir located in the first path terminal portion of the bayonet-type connection slot. Hereby, further movement of the fluid drain plug in the circumferential direction is limited by having the projection located in the first path terminal portion, while permitting fluid to discharge via the drain channel of the body part. In order to interrupt, or terminate, the draining process, the fluid drain plug is further rotated about its centre axis (relative the hole of the fluid reservoir) in the opposite circumferential direction until the second path terminal portion, in which the fluid drain plug is set in the closed position relative the drain hole of the fluid reservoir, i.e. at least a portion of the fluid drain plug forms a liquid-tight configuration with the circumferential surface of the drain hole of the fluid reservoir. In the liquid-tight configuration, no further fluid can be discharged from the fluid reservoir. The fluid drain plug is maintained in the engaged state in the closed position by having the projection of the fluid reservoir located in the second path terminal portion of the bayonet-type connection slot. Hereby, further movement of the fluid drain plug in the circumferential direction is limited by having the projection located in the second path terminal portion. The fluid drain plug can then be removed from the fluid reservoir by rotationally move the plug in the circumferential direction relative the radial projection of the fluid reservoir, from the second path terminal portion to the first path terminal portion, and then rotationally move the plug in the opposite circumferential direction from the first path terminal portion to the entrance, in which the bayonet-type connection slot permit the fluid rain plug to completely disengage from the radial projection and from the fluid reservoir. To remove the fluid drain plug from the fluid reservoir in a simple, yet controlled, manner is useful when there is a need for replacement or cleaning of the used fluid drain plug.

Another example advantage of having a bayonet-type connection slot with a first path and a second path extending in different circumferential directions is that the fluid drain plug is less likely to be accidently separated from the fluid reservoir without a second turn of the fluid drain plug relative the drain hole of the fluid reservoir.

The first path typically comprises the first path terminal portion. Similarly, the second path typically comprises the second path terminal portion. In addition, while the first path and second path extends in different directions, the first path and the second path are typically continuously extending paths of the bayonet-type connection slot. The first path terminal portion and the second path terminal portion can be configured in several different manners to provide the drainage position and the closed position relative the fluid reservoir. By way of example, the first path terminal portion is defined by a first path terminate axial edge facing the distal axial end and a first lip extending from the first path terminate axial edge. Similarly, the second path terminal portion is defined by a second path terminate axial edge facing the distal axial end and a second lip extending from the second path terminal axial edge.

According to one example embodiment, an angular difference $\alpha$ between the first path terminal portion and the second path terminal portion is about between 90 degrees to 180 degrees, as defined in the circumferential direction and relative a centre axis. In this manner, it is believed that the extension of the paths of the bayonet-type connection slot is provided in an optimized manner relative each other in terms of functionality and design.

According to one example embodiment, the first path is a curved path extending from the entrance to the first path terminal portion. Analogously, the second path is a curved path extending from the first path terminal portion to the second path terminal portion. In this manner, the curved paths contribute to a smooth transition between the rotational movement of the fluid drain plug effected by a user and the actual axial displacement of the fluid drain plug due to this rotational movement.

According to example embodiments, any one of the first path and the second path of the bayonet-type connection slot comprises at least one curved path section curving towards the proximal axial end and in the circumferential direction.

According to one example embodiment, an axial extension of the drain channel is greater than the axial distance between the distal axial end and the first terminate axial edge. One advantage is that the available drainage area is dimensioned to ensure an efficient drainage when the fluid drain plug is in the drainage position relative the fluid reservoir.

The drain channel can be provided in several different shapes and extensions. By way of example, the drain channel is an interior drain channel at least partly arranged inside the body part. Alternatively, the drain channel is an exterior drain channel disposed on the outer surface of the body part. It is also conceivable that the drain channel is arranged inside the body part a first axial distance in the axial direction and then continues as an exterior drain channel a subsequent axial distance in the axial direction.

It should be noted that the outlet opening is typically a radial outlet opening, i.e. the outlet is directed radially away from body part.

According to one example embodiment, the fluid drain plug further comprises a circumferential sealing arrangement adapted to provide a fluid-tight connection during use thereof. By having a sealing arrangement in the circumferential direction, the fluid drain plug is provided with an improved radial sealing, and thus not dependent on axial sealing arrangements as other prior art plugs. Typically, the sealing arrangement cooperates with the circumferential surface of the fluid reservoir for providing the fluid-tight connection therebetween when the fluid drain plug is in the closed position relative the fluid reservoir.

Typically, although strictly not required, the circumferential sealing arrangement comprises an annular sealing ring disposed in a circumferential slot on the outer surface of the body part. This type of arrangement allows for using a simple, yet effective, sealing arrangement. In this manner, the radial sealing relative the hole of the fluid reservoir is further improved. According to one example embodiment, the circumferential slot is located between the proximal axial end and the second path terminal portion. In this manner, the radial sealing relative the hole of the fluid reservoir is even further improved.

Typically, the bayonet-type connection slot is dimensioned to match the dimensions of the projection of the fluid reservoir. It should be readily appreciated that the dimension of the bayonet-type connection slot is typically determined in view of the dimensions of the fluid reservoir and type of fluid reservoir.

It is to be noted that the fluid drain plug may be designed with a tolerance relative the hole of the fluid reservoir as long as a fluid-tight configuration can be obtained during use thereof.

The fluid drain plug is typically at least partly made of a lightweight material, such as a plastic material, lightweight steel, aluminium or similar material.

According to one example embodiment, the distal axial end of the body part of the fluid drain plug resembles a truncated cone. In this manner, the fluid drain plug is shaped to be insertable in an even more intuitively manner.

According to a second aspect of the present invention, there is provided a fluid reservoir assembly for a vehicle. The fluid reservoir assembly comprises a fluid reservoir having a substantially circular drain hole with a circumferential surface surrounding the drain hole and a removable fluid drain plug rotationally insertable into the fluid reservoir. The fluid drain plug has an extension in an axial direction and comprises a body part having a proximal axial end, a distal axial end and a substantially circular cross section with an outer surface. Moreover, the body part comprises a drain channel having an inlet located at the distal axial end and an outlet opening disposed on the outer surface. Further, one of the circumferential surface surrounding the drain hole and the outer surface of the body part comprises a radial projection and the other one comprises a bayonet-type connection slot for accommodating a part of the radial projection. The bayonet-type connection slot has an entrance for the radial projection to permit insertion and removal of the fluid drain plug from the drain hole. The bayonet-type connection slot further has a first path terminal portion corresponding to a drainage position, in which the fluid drain plug is arranged relative the drain hole to permit fluid drainage via the drain channel, and a second path terminal portion corresponding to a fluid drain plug closed position, in which the fluid drain plug forms a liquid-tight connection relative the drain hole.

Effects and features of the second aspect are largely analogous to those described above in relation to the first aspect. In particular, the is provided a fluid reservoir assembly in which the fluid drain plug can be maintained in an engaged state relative the fluid reservoir during drainage of fluid from the fluid reservoir, i.e. when the fluid drain plug is set in the drainage position relative the fluid reservoir. Also, by the bayonet-type connection slot including the entrance, the fluid drain plug can be easily removed, e.g. by hand at a low force, and without tools. In addition, the fluid reservoir assembly allows for an efficient drainage and typically a more complete drainage of fluid from the fluid reservoir due to the configuration of the bayonet-type connection slot and the drain channel of the fluid drain plug. The extra drained fluid volume from the fluid reservoir may allow for more fresh fluid to be added to the fluid reservoir, and also less used fluid to be left in the fluid reservoir, thus contributing to a cleaner working environment as well as a longer service interval.

According to one example embodiment, the bayonet-type connection slot is configured to permit a displacement of the plug from the fluid drain plug closed position to the drainage position by a rotational movement of the fluid drain plug in one circumferential direction and a displacement of the fluid drain plug from the drainage position to the entrance by rotational movement of the fluid drain plug in an opposite circumferential direction.

Typically, the bayonet-type connection slot is defined by a first path extending from the entrance to the first path terminal portion and in the axial direction and in one circumferential direction, and a second path extending from the first path terminal portion to the second path terminal portion and in the axial direction and in an opposite direction to the one circumferential direction.

According to one example embodiment, the first path terminal portion is defined by a first path terminate axial edge facing the entrance and a first lip extending from the first path terminate axial edge. Analogously, the second path terminal portion is defined by a second path terminate axial edge facing the entrance and a second lip extending from the second path terminal axial edge.

According to one example embodiment, the outlet opening of the drain channel of the fluid drain plug is oriented towards a bottom surface of the fluid reservoir when the fluid drain plug is positioned in the drainage position. Hereby, the fluid drain plug is oriented in a position relative the fluid reservoir to permit an efficient discharge of fluid from the fluid reservoir.

Further, if the fluid drain plug is insertable in a vertical oriented drain hole of the fluid reservoir, the fluid drain plug is inserted essentially horizontally into the fluid reservoir. Thus, by way of example, the drain hole of the fluid reservoir extends essentially in the vertical direction. In this way, it becomes possible to locate the fluid drain plug and the drain hole of the fluid reservoir at the vertically lowest possible position in the fluid reservoir. One advantage with this arrangement is that essentially all fluid in the fluid reservoir can be drained from the fluid reservoir.

Moreover, it should be noted that a fluid reservoir assembly in which the fluid drain plug is inserted essentially horizontally into drain hole provided on a vertical wall of the fluid reservoir provides for a horizontal bayonet-connection arrangement with the fluid reservoir. It is believed that this type of arrangement of the bayonet-connection provides for improved drainage of the sump of the internal combustion engine compared to fluid reservoir assemblies with vertically arranged fluid drain plugs. In this context, it may be noted that an improved drainage of the sump also typically results in that the fluid reservoir can be filled with an increased amount of new oil. Another advantage with this type of arrangement is that no parts of the fluid drain plug may interfere with the ground clearance of the vehicle, compared to a vertically arranged fluid drain plug inserted from the underneath of the sump of the internal combustion engine.

According to one example embodiment, the fluid drain plug further comprises a circumferential sealing arrangement to provide an improved fluid-tight connection in a radial direction between the fluid reservoir and the fluid drain plug when the fluid drain plug is in the closed position relative the drain hole of the fluid reservoir.

According to one example embodiment, the circumferential sealing arrangement comprises an annular sealing ring disposed in a circumferential slot on the outer surface of the body part. The circumferential slot is located between the proximal axial end and the second path terminal portion.

According to one example embodiment, the circumferential surface of the drain hole comprises the radial projection and the outer surface of the body comprises the bayonet-type connection slot, and the entrance of the bayonet-type connection slot being located at the distal axial end of the body part.

According to one example embodiment, the outer surface of the body comprises the radial projection and the circumferential surface of the drain hole comprises the bayonet-type connection slot, and the entrance of the bayonet-type connection slot being located at an outer end edge of the circumferential surface of the drain hole.

According to a third aspect of the present invention, there is provided a vehicle comprising a fluid reservoir assembly according to any one of the example embodiments described in relation to the second aspect or a fluid drain plug according to any one of the example embodiments described in relation to the first aspect. The vehicle may be a truck, such as a heavy-duty truck. However, the invention is not limited to trucks and heavy-duty trucks. Rather, the vehicle may be any type of vehicle, such as a truck, car, working machine intended for carrying out an operation etc.

Effects and features of the third aspect are largely analogous to those described above in relation to the first aspect and/or second aspect.

The fluid reservoir assembly may be an integral part of an internal combustion engine. Alternatively, the fluid reservoir assembly may be a separate part connected to the internal combustion engine.

According to a fourth aspect of the present invention, there is provided a method controlling drainage of fluid from a fluid reservoir assembly comprising a fluid reservoir having a substantially circular drain hole with a circumferential surface surrounding the drain hole and a removable fluid drain plug rotationally insertable into the fluid reservoir, wherein the fluid drain plug has an extension in an axial direction and comprising a body part having a proximal axial end, a distal axial end and a substantially circular cross section with an outer surface, wherein the body part comprises a drain channel having an inlet located at the distal axial end and an outlet opening disposed on the outer surface, wherein one of the circumferential surface surrounding the drain hole and the outer surface of the body part comprises a radial projection and the other one comprises a bayonet-type connection slot for accommodating a part of the radial projection, the bayonet-type connection slot having an entrance for the radial projection, a first path terminal portion and a second path terminal portion, in which the fluid drain plug forms a liquid-tight connection relative the drain hole. The method comprises the steps: when the fluid drain plug is in the liquid-tight connection relative the drain hole, rotationally displacing the fluid drain plug in one circumferential direction from the second path terminal portion to the first path terminal portion, in which the fluid drain plug is arranged in a drainage position relative the drain hole to permit fluid drainage via the drain channel, and when the fluid drain plug is in the drainage position relative the drain hole, rotationally displacing the fluid drain plug in an opposite direction to the one circumferential direction from the first path terminal portion to the entrance, to permit removal of the fluid drain plug from the drain hole of the fluid reservoir.

Effects and features of the fourth aspect are largely analogous to those described above in relation to the first aspect and/or the second aspect, as well as the third aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
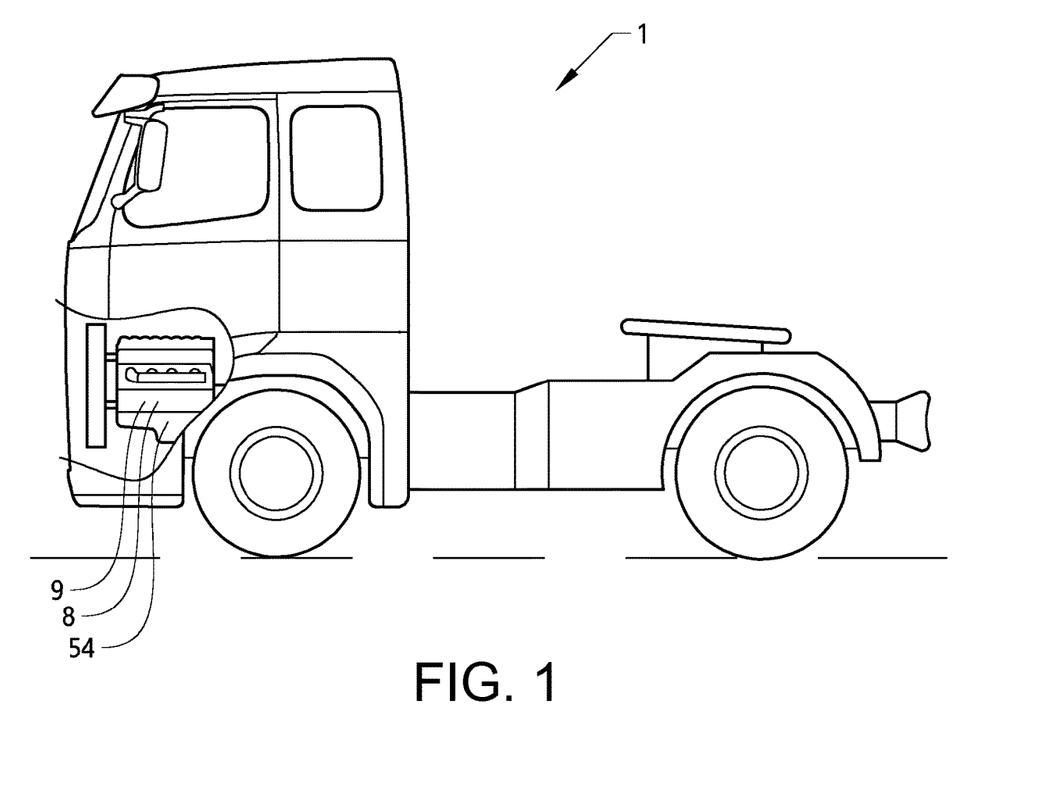
FIG. 1 is a lateral side view illustrating an example of a vehicle in the form of a truck; the vehicle comprising an internal combustion engine system having a fluid reservoir assembly according to one example embodiment of the present invention.

With particular reference to FIG. 1, there is provided a vehicle 1 in the form of a truck. The vehicle comprises an internal combustion engine system 9 having an internal combustion engine 8, such as a diesel engine. Further, the engine or engine system comprises a fluid reservoir assembly 54 according to the example embodiments of the present disclosure. The fluid reservoir assembly 54 is particularly suitable for containing a liquid such as oil for the engine, e.g. lubrication oil for lubricating some of the components making up the engine. In this example, the fluid reservoir assembly is a so called oil pan assembly.

Figure 2:
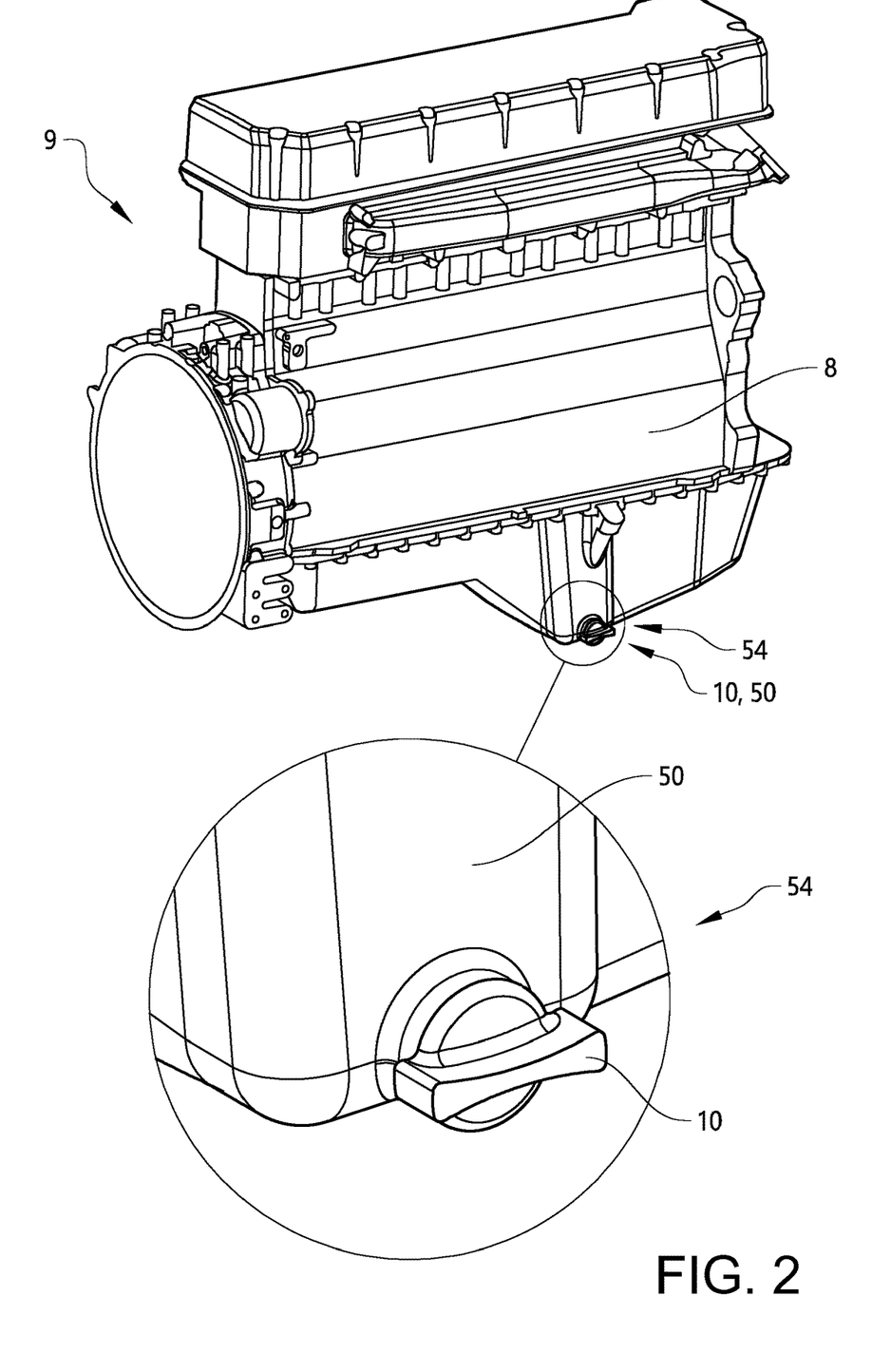
FIG. 2 schematically illustrates parts of the engine in FIG. 1 comprising an example embodiment of a fluid reservoir assembly having a fluid reservoir and a fluid drain plug according to the present invention.

FIG. 2 schematically illustrates an example embodiment of parts of the fluid reservoir assembly 54. The fluid reservoir assembly 54 comprises a fluid reservoir 50 and a fluid drain plug 10 according to the present invention. In this example, the fluid reservoir assembly 54 is an integral part of the internal combustion engine system 9. The parts of the fluid reservoir assembly will be described in more detail in relation to the FIGS. 3a to 3d and FIGS. 4 to 10.

Figure 3A:
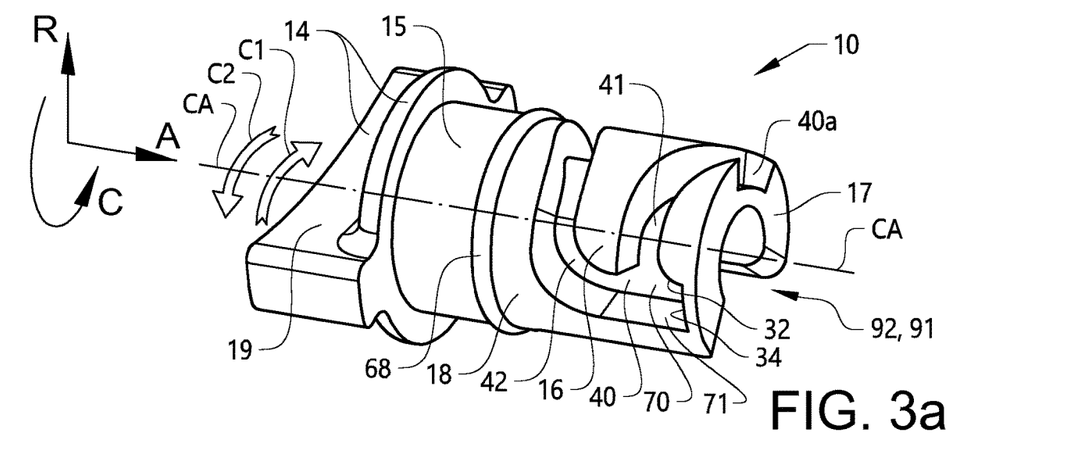
FIGS. 3a to 3c are perspective views of an example embodiment of the fluid drain plug according to the present invention.
Figure 3B:
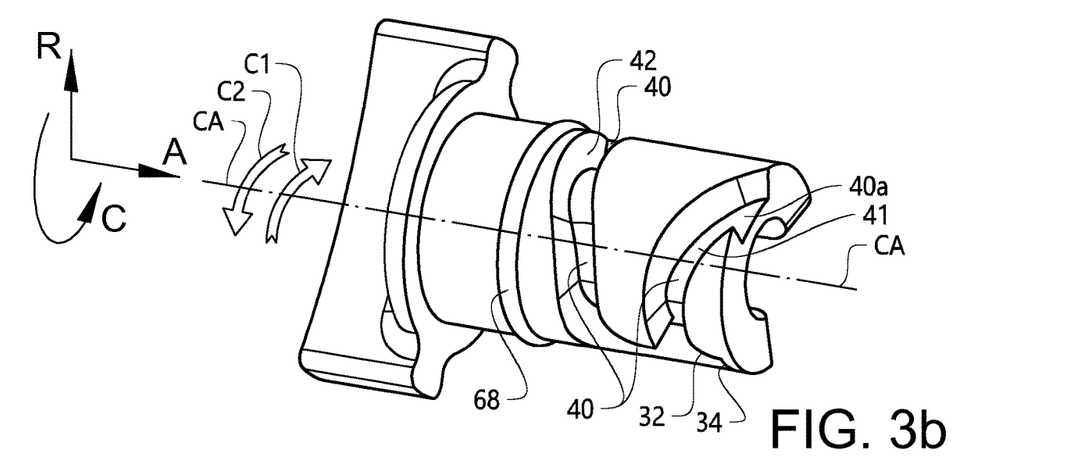
Figure 3C:
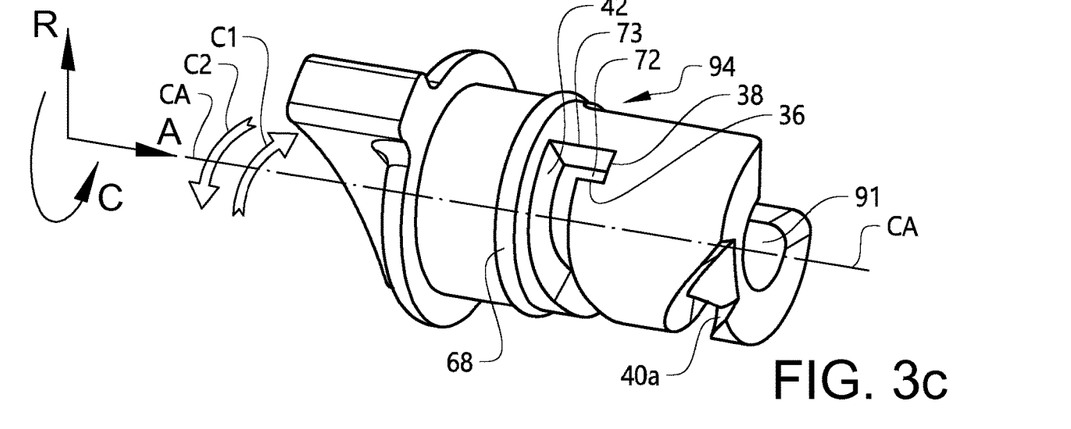
Figure 4:
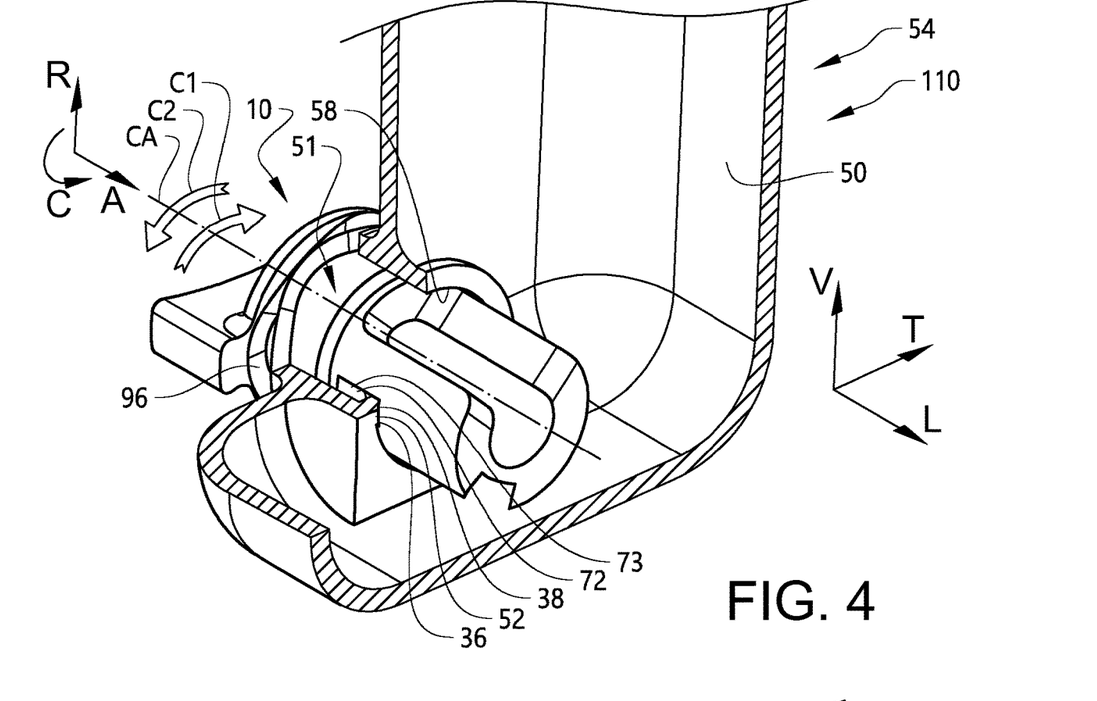
FIGS. 4 to 9 schematically illustrate parts of an example embodiment of the fluid reservoir assembly comprising the fluid reservoir and the fluid drain plug, in which the fluid drain plug is oriented in a closed position, a drainage position and a removable position relative the fluid reservoir.

Turning now to FIG. 4, which is a cross sectional view of parts of the fluid reservoir assembly 54 in FIGS. 1 and 2, the fluid reservoir assembly 54 is illustrated in a state in which the fluid drain plug 10 is arranged in a closed position relative the fluid reservoir 50, thereby forming a liquid-tight configuration for the oil. As may be gleaned from e.g. FIG. 4, but also illustrated in the other Figs. e.g. FIGS. 3a to 3c, the fluid drain plug 10 typically extends in an axial direction A, a radial direction R and in a circumferential direction C. When the fluid drain plug is inserted in a drain hole 51 of the fluid reservoir 50, the drain hole may also be considered as having an extension in the axial direction A, the radial direction R and in the circumferential direction C, while the fluid reservoir 50 may have a longitudinal direction L, a transverse direction T and a vertical direction V, which is indicated in e.g. FIG. 4. However, when the fluid drain plug is inserted into the drain hole of the fluid reservoir, as depicted in FIGS. 4 to 10, the axial direction typically corresponds to the longitudinal direction of the fluid reservoir, while the radial direction typically is at least parallel to the vertical direction of the fluid reservoir. Thus, as depicted in the FIGS. 4 to 10, the fluid drain plug 10 is essentially oriented in parallel with the longitudinal direction of the fluid reservoir 50. It should be noted that the terms top and bottom, as well as any other similar terms are used in reference to the position of the fluid reservoir assembly 54 as depicted in the drawings, e.g. FIGS. 4 to 9, and the assembly may be positioned and used in other orientations.

Figure 9:
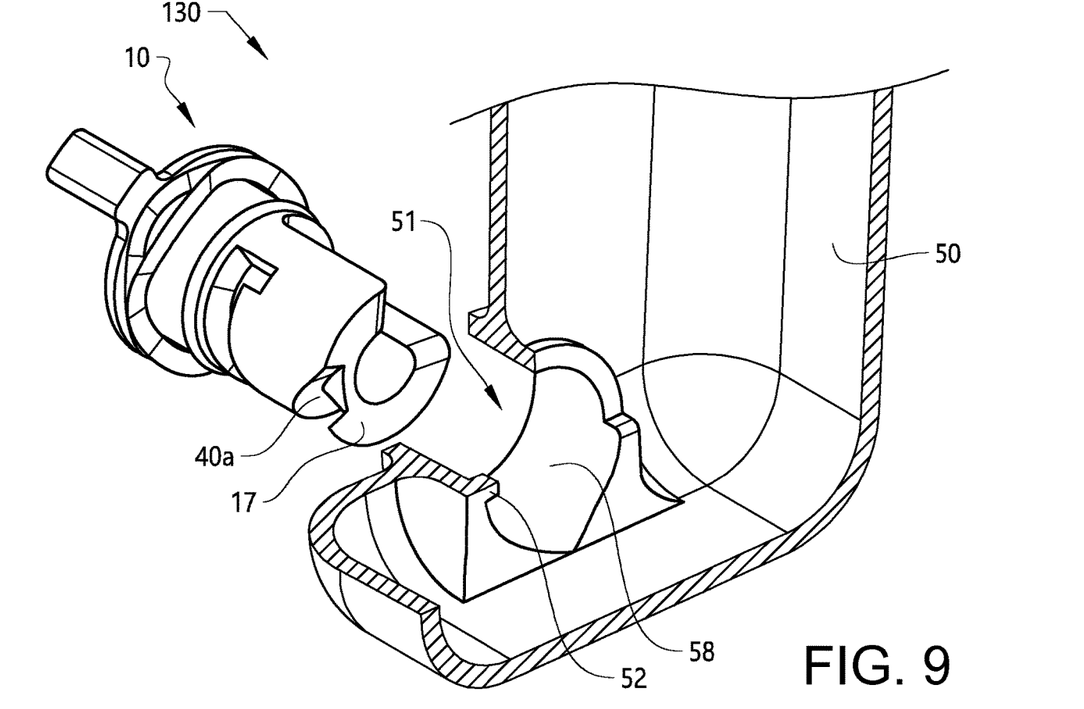

Turning again to FIG. 4, and also FIG. 9, there is illustrated a fluid reservoir 50 comprising the drain hole 51. The drain hole is here substantially circular. The drain hole has a circumferential surface 58 surrounding the drain hole 51. As shown in e.g. FIG. 9, there is a radial projection 52, i.e. a protrusion, extending radially away from the surface 58. Accordingly, the circumferential surface 58 includes the radial projection. The drain hole is adapted to receive the fluid drain plug 10, which is thus rotationally insertable into the fluid reservoir.

One example embodiment of the fluid drain plug will now be further described hereinafter with reference to FIGS. 3a to 3d. FIG. 3a is a perspective view of an example embodiment of the fluid drain plug according to the present invention. In FIG. 3b, the fluid drain plug of the example embodiment is illustrated in a rotated position about the center axis CA of about 90 degrees relative the view (position) of the fluid drain plug in FIG. 3a, i.e. rotated in a clockwise rotation about the center axis CA, also corresponding to the circumferential direction C2, as illustrated in FIGS. 4 to 9. In FIG. 3c, the fluid drain plug of the example embodiment is illustrated in a rotated position about the center axis CA of about 90 degrees relative the view (position) of the fluid drain plug in FIG. 3b, i.e. rotated in the clockwise rotation about the center axis CA, also corresponding to the circumferential direction C2, as illustrated in FIGS. 4 to 9.

The fluid drain plug 10, also denoted as the drain plug or simply as the plug, has an extension in the axial direction A and in the radial direction R. The plug comprises a body part 16 rotationally insertable into the drain hole 51. Moreover, the body part 16 has a proximal axial end 15, a distal axial end 17 and a substantially circular cross section with an outer surface 18. The circular cross section is perpendicularly arranged relative the axial extension of the body part.

In this example embodiment, the plug also comprises a head part 14 grippable by a user. The head part typically extends from the proximal axial end 15. In addition, the head part here comprises a tab portion 19 grippable by a user from the outside of the fluid drain plug.

Figure 6:
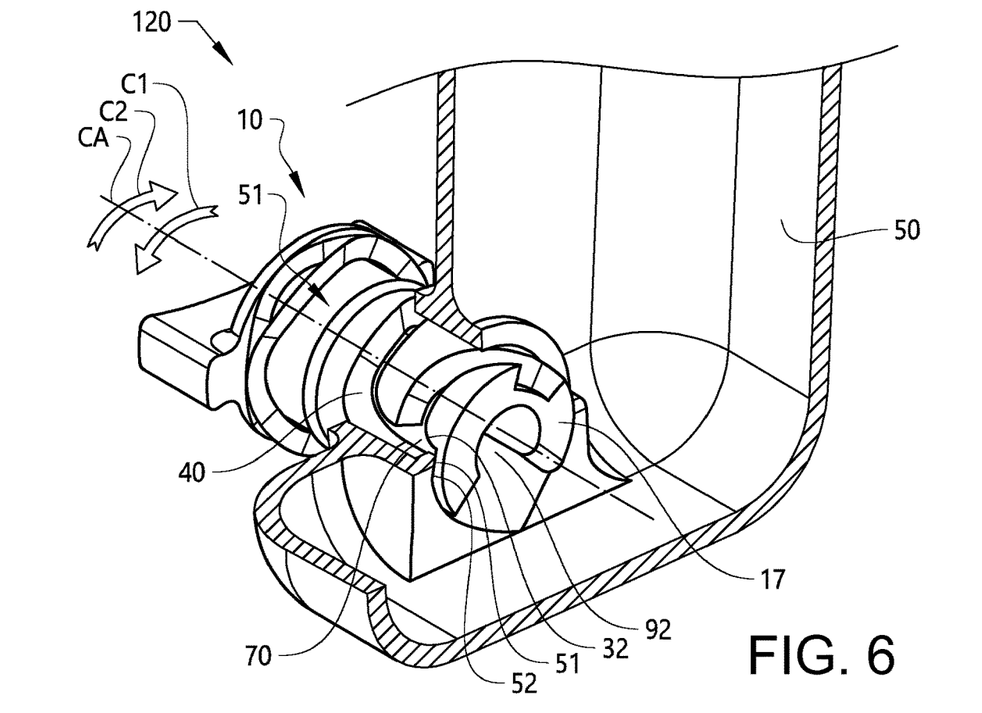
Figure 7:
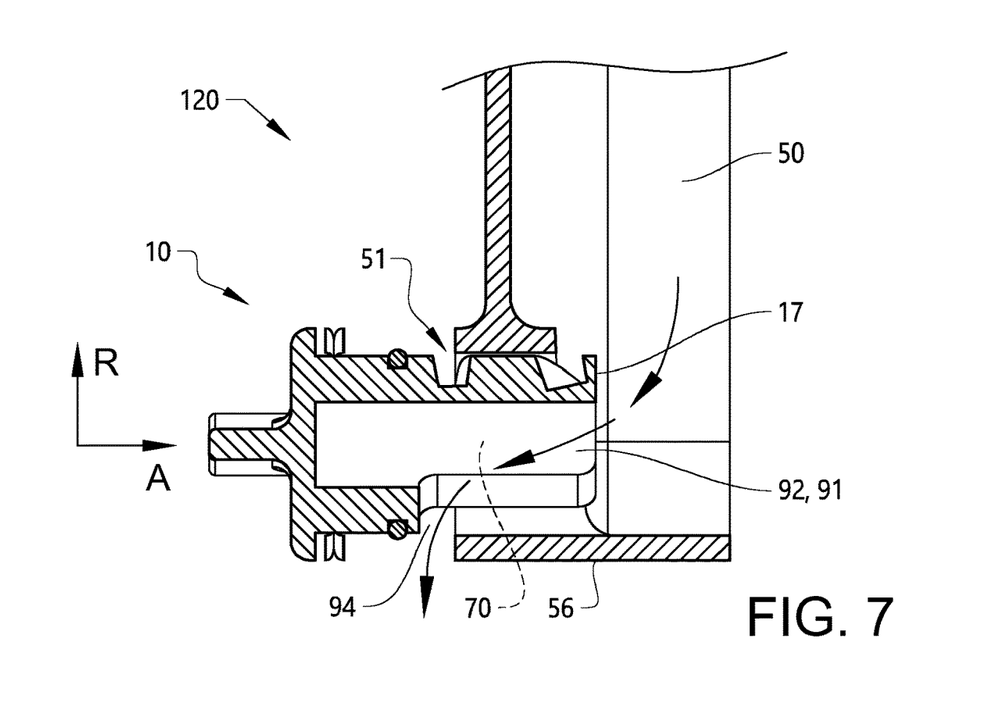

Turning again to e.g. FIG. 3a, the body part 16 comprises a drain channel 92, which has an inlet 91 located at the distal axial end 17 and an outlet opening 94 disposed on the outer surface 18, see e.g. FIG. 7. In this example, the outlet opening is a radial outlet opening. Moreover, as shown in FIG. 7, the drain channel is an exterior drain channel, i.e. a channel disposed on the outer surface 18. In this example, an axial extension of the drain channel 92 is greater than the axial distance between the distal axial end 17 and a first terminate axial edge 34, see e.g. FIG. 3a in conjunction with FIG. 6 or FIG. 7.

Further, the body part 16 further comprises a bayonet-type connection slot 40 for accommodating a part of the radial projection 52 of the circumferential surface surrounding the drain hole 51. The bayonet-type connection slot 40 is disposed on the outer surface 18. As illustrated in e.g. FIG. 3a, the bayonet-type connection slot comprises an entrance 40a at the distal axial end 17, a first path 41 and a second path 42.

The first path 41 extends from the entrance 40a, in the axial direction A and in one circumferential direction C2, to a first path terminal portion 70. Typically, the circumferential extension of the first path ends at the circumferential end portion 71 (which here is a circumferential end surface). The first path terminal portion 70 is adapted to accommodate the radial projection 52. In this example, the first path terminal portion is defined by a first path terminate axial edge 34 facing the distal axial end and a first lip 32 (see also e.g. FIG. 3b) extending from the first path terminate axial edge. Moreover, as illustrated in the FIG. 3a, the first path 41 is a curved path extending from the entrance 40a to the first path terminal portion 70.

Analogously, the second path 42 extends from the first path terminal portion 70, in the axial direction A and in an opposite direction C1 to the one circumferential direction C2, to a second path terminal portion 72. Typically, the circumferential extension of the second path ends at a circumferential end portion 73 (which here is a circumferential end surface). The second path terminal portion 72 is adapted to accommodate the radial projection. In this example, the second path terminal portion is defined by a second path terminate axial edge 38 facing the distal axial end and a second lip 36 extending from the second path terminal axial edge. Moreover, as illustrated in the FIG. 3b, the second path 42 is a curved path extending from the first path terminal portion 70 to the second path terminal portion 72.

It should be readily appreciated that the curved path can vary in curvature, and that the level of curvature is normally determined depending on desired level of axial displacement of the drain plug relative the fluid reservoir when rotated about its center axis CA. For example, any one of the first path and the second path of the bayonet-type connection slot can have one curved path section curving towards the proximal axial end 15 and in the circumferential direction C.

As described above in relation to the FIGS. 3a to 3c, the bayonet-type connection slot 40 is configured to accommodate a part of the radial projection 52. That is, the bayonet-type connection slot has the entrance 40a for the radial projection to permit insertion and removal of the drain plug from the drain hole. Further, the bayonet-type connection slot includes the first path terminal portion 70 corresponding to the drainage position, in which the drain plug is arranged relative the drain hole 51 to permit fluid drainage via the drain channel 92. Also, the bayonet-type connection slot 40 includes the second path terminal portion 72 corresponding to the drain plug closed position, in which the drain plug forms a liquid-tight connection relative the drain hole 51 of the fluid reservoir. To this end, the bayonet-type connection slot is configured to permit a displacement of the fluid drain plug from the drain plug closed position to the drainage position by a rotational movement of the drain plug in one circumferential direction C1 and a displacement of the drain plug from the drainage position to the entrance by rotational movement of the drain plug in an opposite circumferential direction C2. The various states of the fluid drain plug relative the fluid reservoir will be further described in relation to the FIGS. 4 to 10 below.

Figure 3D:
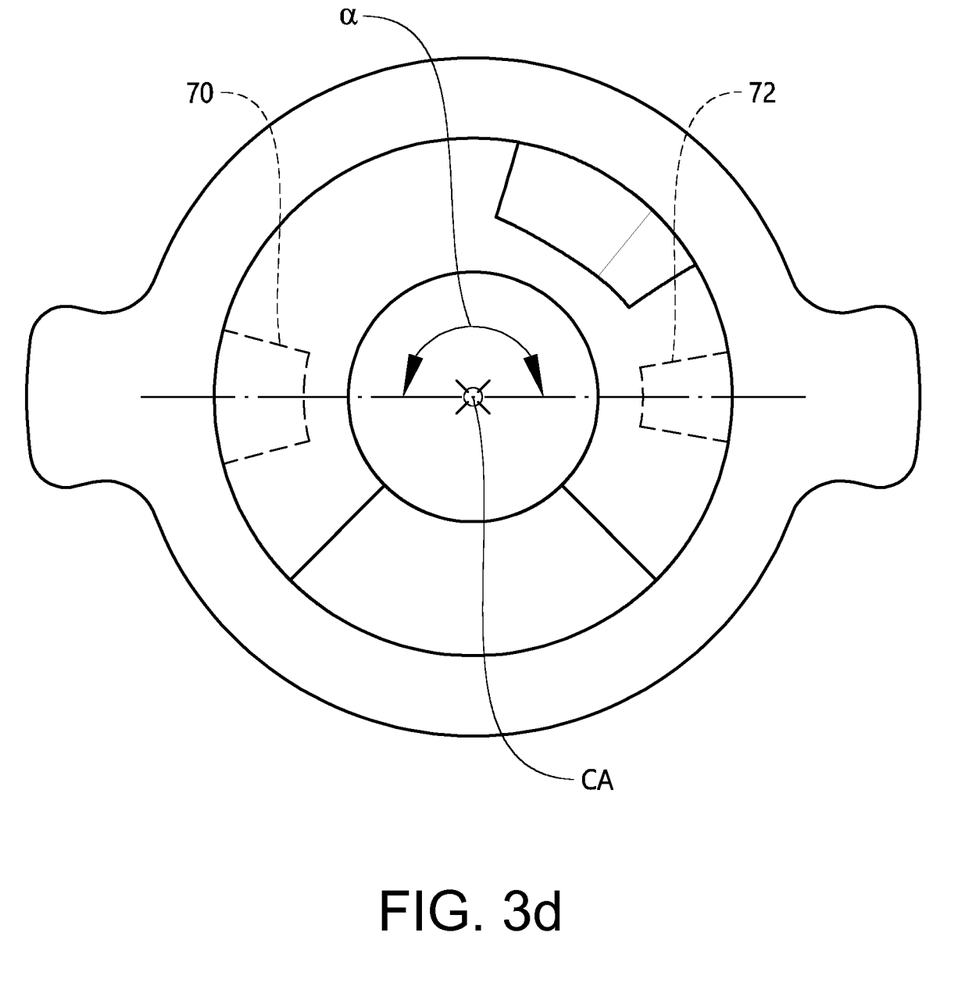
FIG. 3d is a cross sectional view of the example embodiment of the fluid drain plug in FIGS. 3a to 3c.

The relative position between the first path terminal portion 70 and the second path terminal portion 72 may vary for different types of assemblies. The relative position of the two portions 70, 72 in the circumferential direction is depicted in FIG. 3d, which is a cross sectional view of the example embodiment of the fluid drain plug in FIGS. 3a to 3c. Typically, although strictly not required, an angular difference α between the first path terminal portion 70 and the second path terminal portion 72 is about between 90 degrees to 180 degrees, as defined in the circumferential direction and relative a center axis CA.

Optional, the drain plug has a circumferential sealing arrangement 68 adapted to provide an improved fluid-tight connection during use thereof. The circumferential sealing arrangement 68 comprises an annular sealing ring disposed in a circumferential slot on the outer surface 18 of the body part 17. As shown in e.g. FIG. 3c, the circumferential slot is located between the proximal axial end 15 and the second path terminal portion 72.

Turning now to the use of the fluid drain plug and the fluid reservoir, and the various relative positions between the components, FIGS. 4 to 9 schematically illustrate parts of an example embodiment of the fluid reservoir assembly comprising the fluid reservoir and the fluid drain plug, in which the fluid drain plug is oriented in a closed position 110, a drainage position 120 and a removable position 130 relative the fluid reservoir.

In particular, FIG. 4 depicts the closed position 110 between the fluid drain plug 10 and the fluid reservoir 50. In the closed position, the fluid drain plug is arranged in a fully engaged state with the fluid reservoir, thus preventing oil from escaping from the fluid reservoir via the drain hole 51. Moreover, in the closed state 110, the radial projection 52 of the fluid reservoir 50 is located in the second path terminal portion 72 of the bayonet-type connection slot 40. That is, the second path terminal portion 72 accommodates the radial projection 52. In this state, the fluid drain plug 10 is prevented from moving in the circumferential direction C2 and the circumferential direction C1 by the second path terminal portion 72. That is, the fluid drain plug 10 is prevented from moving in the circumferential direction C2 by the circumferential end portion 73 of the second path and in the circumferential direction C1 by the second lip 36 of the second path terminal portion 72. In addition, the second path terminate axial edge 38 prevents the fluid drain plug from axially displacing away from the drain hole 51 of the fluid reservoir.

As illustrated in FIG. 4, the fluid drain plug here also comprises an annular spring member 96 arranged about the body part and in-between the sealing arrangement and the head part. The annular spring member is configured to provide a spring load to the fluid reservoir assembly when the fluid drain plug is in the closed position relative the fluid reservoir. Thus, the annual spring member further contributes to remain the fluid drain plug in the closed position relative the fluid reservoir. Also, it is believed that when the fluid reservoir is filled with oil, the oil will exert pressure on the fluid drain plug at its distal axial end 17, thus also contribute to remain the fluid drain plug in the closed position relative the fluid reservoir, i.e. when the radial projection is in the second path terminal portion 72.

Figure 5:
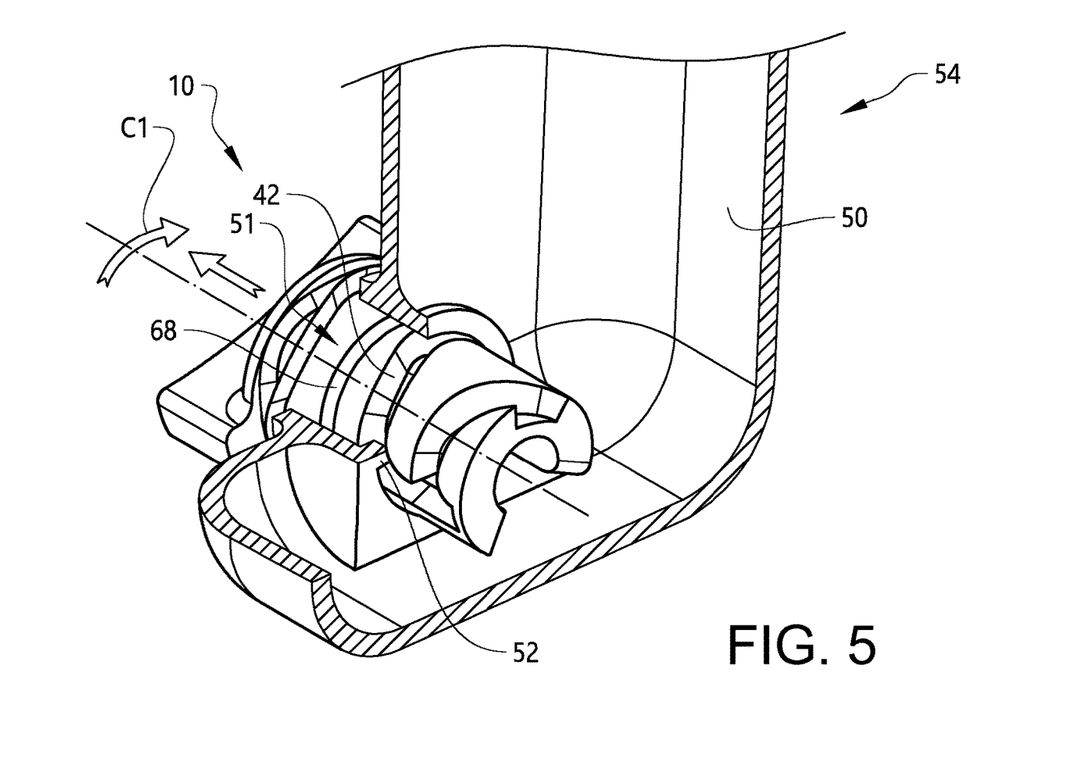

Turning now to FIG. 5, the fluid drain plug 10 is rotated about its center axis CA and in the circumferential direction C1. In this example, the fluid drain plug is manipulated by a user, i.e. the user grips the tab portion 19 and effects a movement of the fluid drain plug by an axial and rotational movement of the fluid drain plug. As may be gleaned from FIG. 5, the fluid drain plug 10 is rotated about between 150 to 170 degrees in the circumferential direction C1 compared to the position of the fluid drain plug 10 depicted in FIG. 4. In this state, the sealing arrangement 68 is still in an engaged state with the circumferential surface of the drain hole, thus ensuring a liquid-tight configuration between the fluid drain plug and the fluid reservoir. As illustrated in FIG. 5, the radial projection 52 is positioned in the second path 42 of the bayonet-type connection 40. In other words, the dimension and shape of the second path 42 defines the axial displacement of the fluid drain plug relative the fluid reservoir.

Moreover, from FIGS. 4 and 5, it can be readily appreciated that the fluid drain plug is typically released from the closed position (FIG. 4) by a push and rotate movement, i.e. a push of the fluid drain plug in the axial direction against the fluid reservoir followed by a rotational movement in the circumferential direction. In this manner, the radial projection 52 is released from the position in the second path terminal portion 72.

Turning now to FIGS. 6 and 7, which depict the drainage position 120 between the fluid drain plug 10 and the fluid reservoir 50. In the drainage position 120, the fluid drain plug 10 is arranged in an orientation relative the fluid reservoir such that the drain channel 92 is oriented towards the bottom surface of the fluid reservoir 56 and further axially displaced from the fluid reservoir to define an opening for the fluid via the drain hole 51 and the drain channel 92. Accordingly, in the drainage position 120, oil is permitted to escape from the fluid reservoir via the drain hole 51 and subsequently the drain channel 92.

Moreover, in the drainage position 120, the radial projection 52 of the fluid reservoir is located in the first path terminal portion 70 of the bayonet-type connection slot 40. That is, the first path terminal portion 70 accommodates the radial projection 52. In this state, or position, the fluid drain plug 10 is prevented from moving in the circumferential direction C2 and the circumferential direction C1 by the first path terminal portion 70. That is, the fluid drain plug 10 is prevented from moving in the circumferential direction C2 by the circumferential end portion 71 (see e.g. FIG. 3a) of the first path and in the circumferential direction C1 by the first lip 32 of the first path terminal portion 70. In addition, the first path terminate axial edge 34 prevents the fluid drain plug 10 from axially displacing away from the drain hole 51 of the fluid reservoir.

As illustrated in FIG. 7, when the fluid drain plug 10 is arranged in the drainage position 120 relative the fluid reservoir, the drain channel 92 is arranged to permit drainage of the oil from the fluid reservoir through the drain channel 92. That is, oil is drained to the outside via the inlet 91 at the distal axial end and through the radial outlet opening 94 of the drain channel 92. In other words, the relative position between the drain channel and the first path terminal portion 70 is provided such that the outlet opening 94 of the drain channel is oriented towards the bottom surface 56 when the fluid drain plug is arranged in the drainage position 120 relative the fluid reservoir 50. In this way, fluid such as oil can be transported from inside the fluid reservoir 50 to the outside of the fluid reservoir as indicated by the arrows in FIG. 7.

Figure 8:
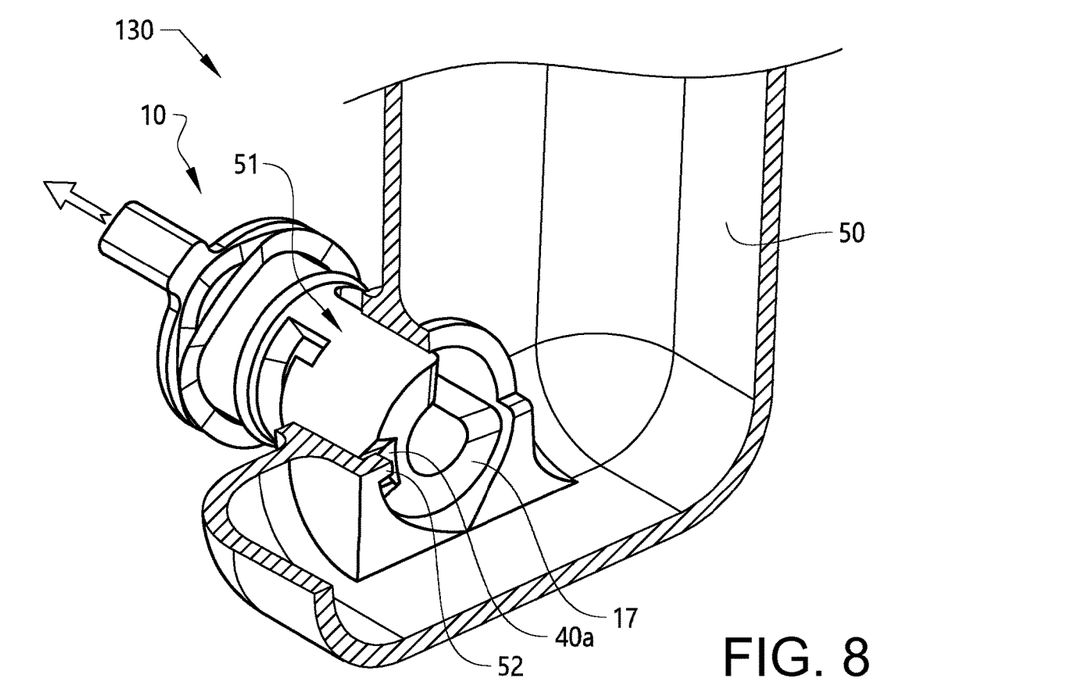

While now referring to FIGS. 8 and 9, there is depicted a state of the fluid reservoir assembly, in which the fluid drain plug 10 has been rotated in the circumferential direction so as to permit the fluid drain plug 10 to be removed from the fluid reservoir 50. That is, when the fluid drain plug is in the drainage position 120, as shown in FIGS. 6 and 7, and it is desired to remove the fluid drain plug completely from the fluid reservoir, the fluid drain plug can be released from the drainage position by a plug and reverse rotational movement from the first path terminate portion 70 to the entrance 40a. More specifically, the fluid drain plug is pushed in the axial direction A against the fluid reservoir 50 followed by a rotational movement in the circumferential direction C2. In this manner, the radial projection 52 is released from the position in the first path terminal portion 70, permitting the fluid drain plug to be rotated by relatively moving the radial projection 52 along the first path 41 until the radial projection is at the entrance 40a of the fluid drain plug, as illustrated in FIG. 8. In this state, which can be referred to as the removable state or removed state 130, the fluid drain plug 10 can be completely released and removed from the fluid reservoir 50, as also illustrated in FIG. 9. The removed fluid drain plug can then be cleaned or replaced with a new fluid drain plug 10.

The new fluid drain plug 10 is then inserted into the drain hole 51 by inserting the distal axial end 17 of the fluid drain plug into drain hole 51, while locating the radial projection 52 in the entrance 40a of the bayonet-type connection slot 40. Thereafter, the user will rotate the fluid drain plug in the circumferential direction C1 until the radial projection 52 is in the first path terminal portion, i.e. the drainage position, or continue to rotate the fluid drain plug in the opposite circumferential direction C2 until the radial projection is in the second path terminal portion, i.e. the closed position. That is, the user can set the fluid drain plug in the various positions relative the fluid reservoir by a relative movement of the radial projection in the bayonet-type connection slot.

It is to be noted that any numerical designations, such as "first" or "second" are illustrative only and are not intended to limit the scope of the invention in any way.

Figure 10:
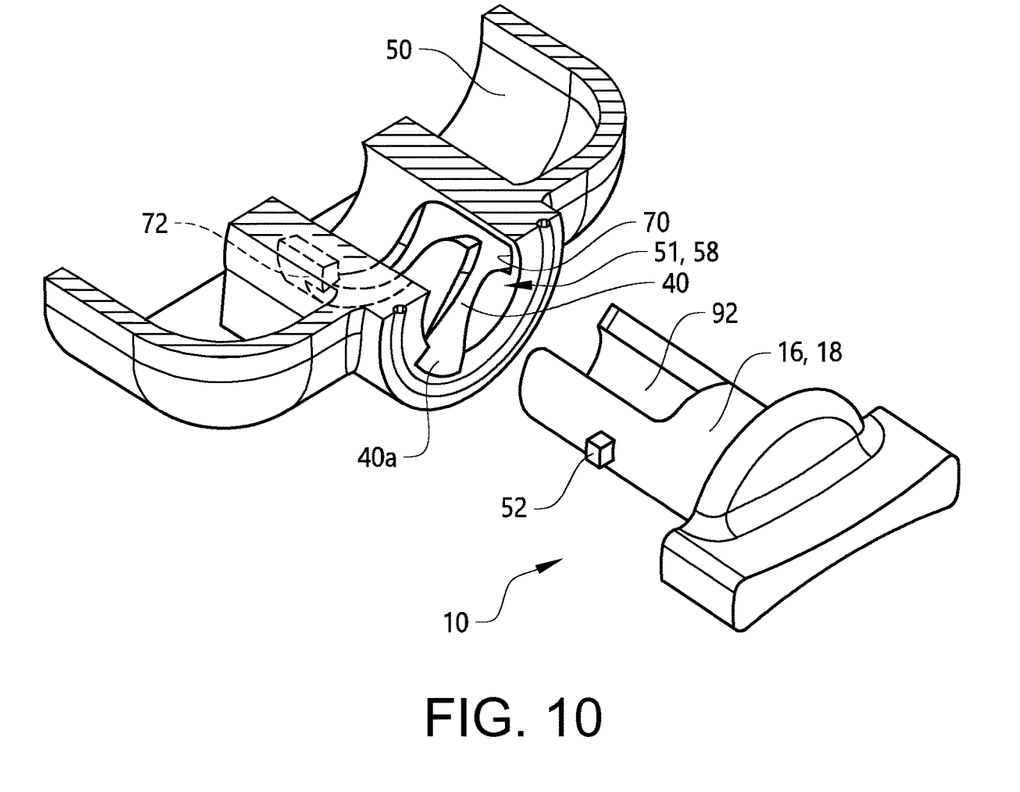
FIG. 10 schematically illustrate parts of another example embodiment of the fluid reservoir assembly comprising a fluid reservoir and a fluid drain plug, in which the fluid drain plug is orientated in a removable position relative the fluid reservoir, and wherein a bayonet-connection slot is disposed on the fluid reservoir.

It is also to be understood that the present invention is not limited to the embodiments described above and illustrated in the drawings; rather, the skilled person will recognize that many changes and modifications may be made within the scope of the appended claims. In particular, while the example embodiments are described in relation to an example when the bayonet-type connection slot 40 is a part of the fluid drain plug 10 and the radial projection is part of the fluid reservoir, the bayonet-type connection slot may likewise be a part of the fluid reservoir 50, while the radial projection is part of the fluid drain plug 10. One example embodiment of this type of fluid reservoir assembly is illustrated in FIG. 10, which is a partly cross sectional perspective view of parts the fluid reservoir assembly. In FIG. 10, the fluid drain plug 10 is orientated in a removed position relative the fluid reservoir. As illustrated in FIG. 10, the outer surface 18 of the body part 16 of the fluid drain plug 10 comprises the radial projection 52. Further, the bayonet-connection slot 40 is here disposed on the fluid reservoir 50. In particular, the circumferential surface 58 surrounding the drain hole 51 comprises the bayonet-type connection slot 40 for accommodating a part of the radial projection 52. Similar to the arrangement of the bayonet-connection slot as described in relation to FIGS. 4 to 9, the example of the bayonet-type connection slot 40 in FIG. 10 comprises the entrance 40a for the radial projection 52 to permit insertion and removal of the fluid drain plug 10 from the drain hole 51, the first path terminal portion 70 corresponding to the drainage position, in which the drain plug is arranged relative the drain hole 51 to permit fluid drainage via the drain channel 92, and the second path terminal portion 72 corresponding to the fluid drain plug closed position, in which the fluid drain plug 10 forms the liquid-tight connection relative the drain hole 51.

Also, it should be readily appreciated that although some components are mentioned and/or illustrated as having certain dimensions and shapes, the dimensions and shapes of these components may likewise be provided in other shapes and dimensions, such as components having cross sections resembling circular-, oval-, rectangular- and triangular-shaped cross sections, or any other conceivable cross-section, as long as nothing else is mentioned in relation to these components and the components can provide their functions.

The invention claimed is:

1. A fluid drain plug for a fluid reservoir with a drain hole, the plug having an extension in an axial direction and comprising a body part rotationally insertable into the drain hole, the body part having a proximal axial end, a distal axial end and a substantially circular cross section with an outer surface, wherein the body part comprises a drain channel having an inlet located at the distal axial end and an outlet opening disposed on the outer surface, the body part further comprising a bayonet-type connection slot for accommodating a part of a radial projection of a circumferential surface surrounding the drain hole, the bayonet-type connection slot being disposed on the outer surface and comprises an entrance at the distal axial end, a first path and a second path,
the first path extending from the entrance, in the axial direction and in one circumferential direction, to a first path terminal portion, wherein the first path terminal portion is adapted to accommodate the radial projection, and
the second path extending from the first path terminal portion, in the axial direction and in an opposite direction to the one circumferential direction, to a second path terminal portion, wherein the second path terminal portion is adapted to accommodate the radial projection.

2. Drain plug according to claim 1, wherein the first path terminal portion is defined by a first path terminate axial edge facing the distal axial end and a first lip extending from the first path terminate axial edge, and the second path terminal portion is defined by a second path terminate axial edge facing the distal axial end and a second lip extending from the second path terminal axial edge.

3. Drain plug according to claim 1, wherein an angular difference between the first path terminal portion and the second path terminal portion is about between 90 degrees to 180 degrees, as defined in the circumferential direction and relative a center axis.

4. Drain plug according to claim 1, wherein the first path is a curved path extending from the entrance to the first path terminal portion and the second path is a curved path extending from the first path terminal portion to the second path terminal portion.

5. Drain plug according to claim 1, wherein any one of the first path and the second path of the bayonet-type connection slot comprises at least one curved path section curving towards the proximal axial end and in the circumferential direction.

6. Drain plug according to claim 1, wherein an axial extension of the drain channel is greater than the axial distance between the distal axial end and the first terminate axial edge.

7. Drain plug according to claim 1, wherein the drain channel is an interior drain channel at least partly arranged inside the body part.

8. Drain plug according claim 1, wherein the drain channel is an exterior drain channel disposed on the outer surface.

9. Drain plug according to claim 1, further comprising a circumferential sealing arrangement adapted to provide a fluid-tight connection during use thereof.

10. Drain plug according to claim 9, wherein the circumferential sealing arrangement comprises an annular sealing ring disposed in a circumferential slot on the outer surface of the body part, the circumferential slot being located between the proximal axial end and the second path terminal portion.

11. A fluid reservoir assembly for a vehicle comprising a fluid reservoir having a substantially circular drain hole with a circumferential surface surrounding the drain hole and a removable fluid drain plug rotationally insertable into the fluid reservoir, wherein the plug has an extension in an axial direction and comprises a body part having a proximal axial end, a distal axial end and a substantially circular cross section with an outer surface, wherein the body part comprises a drain channel having an inlet located at the distal axial end and an outlet opening disposed on the outer surface, wherein one of the circumferential surface surrounding the drain hole and the outer surface of the body part comprises a radial projection and the other one comprises a bayonet-type connection slot for accommodating a part of the radial projection, the bayonet-type connection slot having an entrance for the radial projection to permit insertion and removal of the fluid drain plug from the drain hole, the bayonet-type connection slot further having a first path terminal portion corresponding to a drainage position, in which the fluid drain plug is arranged relative the drain hole to permit fluid drainage via the drain channel, and a second path terminal portion corresponding to a fluid drain plug closed position, in which the fluid drain plug forms a liquid-tight connection relative the drain hole.

12. Fluid reservoir assembly according to claim 11, wherein the bayonet-type connection slot is configured to permit a displacement of the plug from the fluid drain plug closed position to the drainage position by a rotational movement of the fluid drain plug in one circumferential direction and a displacement of the fluid drain plug from the drainage position to the entrance by rotational movement of the fluid drain plug in an opposite circumferential direction.

13. Fluid reservoir assembly according to claim 11, wherein the bayonet-type connection slot is defined by a first path extending from the entrance to the first path terminal portion and in the axial direction and in one circumferential direction, and a second path extending from the first path terminal portion to the second path terminal portion and in the axial direction and in an opposite direction to the one circumferential direction.

14. Fluid reservoir assembly according to claim 13, wherein the first path terminal portion is defined by a first path terminate axial edge facing the entrance and a first lip extending from the first path terminate axial edge, and the second path terminal portion is defined by a second path terminate axial edge facing the entrance and a second lip extending from the second path terminal axial edge.

15. Fluid reservoir assembly according to claim 11, wherein the outlet opening of the drain channel of the fluid drain plug is oriented towards a bottom surface of the fluid reservoir when the fluid drain plug is positioned in the drainage position.

16. Fluid reservoir assembly according to claim 11, wherein the fluid drain plug further comprises a circumferential sealing arrangement to provide a fluid-tight connection in a radial direction between the fluid reservoir and the fluid drain plug when the fluid drain plug is in the closed position relative the drain hole of the fluid reservoir.

17. Fluid reservoir assembly according to claim 16, wherein the circumferential sealing arrangement comprises an annular sealing ring disposed in a circumferential slot on the outer surface of the body part, the circumferential slot being located between the proximal axial end and the second path terminal portion.

18. Fluid reservoir assembly according to claim 11, wherein the circumferential surface of the drain hole comprises the radial projection and the outer surface of the body comprises the bayonet-type connection slot, and the entrance of the bayonet-type connection slot being located at the distal axial end of the body part.

19. Fluid reservoir assembly according to claim 11, wherein the outer surface of the body comprises the radial projection and the circumferential surface of the drain hole comprises the bayonet-type connection slot, and the entrance of the bayonet-type connection slot being located at an outer end edge of the circumferential surface of the drain hole.

20. A vehicle comprising a fluid reservoir assembly according to claim 11.

21. A method for controlling drainage of fluid from a fluid reservoir assembly comprising a fluid reservoir having a substantially circular drain hole with a circumferential surface surrounding the drain hole and a removable fluid drain plug rotationally insertable into the fluid reservoir, wherein the fluid drain plug has an extension in an axial direction and comprising a body part having a proximal axial end, a distal axial end and a substantially circular cross section with an outer surface, wherein the body part comprises a drain channel having an inlet located at the distal axial end and an outlet opening disposed on the outer surface, wherein one of the circumferential surface surrounding the drain hole and the outer surface of the body part comprises a radial projection and the other one comprises a bayonet-type connection slot for accommodating a part of the radial projection, the bayonet-type connection slot having an entrance for the radial projection, a first path terminal portion and a second path terminal portion, in which the fluid drain plug forms a liquid-tight connection relative the drain hole, wherein the method comprises the steps:

when the fluid drain plug is in the liquid-tight connection relative the drain hole, rotationally displacing the fluid drain plug in one circumferential direction from the second path terminal portion to the first path terminal portion, in which the fluid drain plug is arranged in a drainage position relative the drain hole to permit fluid drainage via the drain channel, and when the fluid drain plug is in the drainage position relative the drain hole, rotationally displacing the fluid drain plug in an opposite direction to the one circumferential direction from the first path terminal portion to the entrance, to permit removal of the fluid drain plug from the drain hole of the fluid reservoir.

* * * * *